Patented Mar. 28, 1939

2,152,593

UNITED STATES PATENT OFFICE 2,152,593

METHOD OF PREPARING YEAST RAISED DOUGH FOR BAKING

Henry Jung, Manhattan, Ill.

No Drawing. Application July 9, 1937,
Serial No. 152,758

2 Claims. (Cl. 99—90)

My invention is concerned with the preparation of a dough for bread baking that shall avoid the factors which prevent formation of the natural esters involved in the process and consequently produce a bread void of flavor as compared with what is produced by my novel process.

To this end I check the foreign and putrefactive ferments in a preliminary yeastless mixture by applying in said mixture the well known preservative properties of salt and sugar, both normal ingredients, in the manner hereinafter described.

The records of the chemistry of baking name a number of substances inimical to foreign and putrefactive ferment. But it is also mentioned that those substances are naturally also inimical to related, or alcoholic fermentation, being of an alkaline nature; off taste and even unwholesome. So that, with exception of intense refrigeration of such a dough through expensive equipment, there has not, prior to my idea, been conceived an arrangement whereby such checking can be achieved through use of the customary materials employed by bakers, and, for an unusually prolonged period of time.

The nature of the damage caused by such foreign ferment is, that any kind of ferment, whether foreign or related, will consume the dextrine and maltose as fast as they form instead of permitting them to accumulate to the benefit of the formation of the esters which occurs during the fermentation after the yeast is later added. The formation of the dextrine and maltose is effected by the action of the nitrogenous enzyme, diastase, proceeding from the protein portion of the flour (gluten) upon the starch. And these two substances, dextrine and maltose, constitute the group of fermentable substances within a bread dough which determine, through their fermentation, the characteristic esters finally formed therein. Aromatic salts of ester, like all salts, are the product of the combination of a base and an acid, or several acids of organic origin peculiar to a bread dough, the base in their instance being alcohol. Esters are widely distributed in nature and determine the aroma and flavor of the nectars, fruits, and all food and drink in which a similar process occurs.

The prior art, which is still universally practiced, consists in a cursory incorporation of all customary materials—initially including the yeast—so as to effect an early rising of the bread, and with mechanical score of the loaf as the first desideratum. Palatability, while it is of first importance to the consumer, is regarded by the baker as necessarily incidental—or accidental—to whatever degree obtained—to mechanical score. In this prior art diastatic action was copious and presented no problem previous to the degermination of the flour (removal of the embryo) in this century. The embryo was a prolific source of the diastatic enzyme. The unbolted flours of the stone-grinding era presented no problem of either diastatic action or foreign ferment in the prior art because of the ease with which they fermented—due to the lower grades of flour not being bolted out. Again, diastatic action was favored because of the slow brewery yeast, and bakers' leaven, employed in those days; and the prior art did not aim at the objectives it does today, such as symmetry, size or volume, slice color and formation, moisture and keeping quality.

Knowing that a long time yeastless mass, if guarded against foreign ferment, when finally yeasted and fermented into a finished dough, lends itself more perfectly to the requirements of the scaling machine (divider) and moulding machines than initially yeasted doughs, and, knowing that such a mass, if preserved, is capable of producing the products of diastatic action in accumulation, and capable of being held for the duration of the off-duty period of the production crew, I consider the arrangement hereinafter set forth as a three-fold improvement in a bread dough, viz., adaptability to machines, of a high degree of palatability, and, utilization of time not chargeable to labor.

In carrying out my invention I mix a yeastless batch of the quantity of bread desired in two sections, related or dependent to and on each other, each in sizable portions which together equal to the quantity of finished dough to be finally made. In one of the batches or sections I omit the sugar but include all of the salt for the two sections, or final dough. In the other section I omit the salt but include all of the sugar for the two sections or final dough. I have found that the concentration of the two materials, used in this manner as preservatives for the two sections, viz., sugar and salt, in the separate sections is effective in keeping down the foreign ferment in those sections at a normal dough temperature, whereas, when they are employed in normal quantities, separately or in combination as in a single batch of either yeastless or yeasted dough, each is too weak, as their characteristic manners of preserving differ. And salt and sugar do not interfere with the diastatic action because that action is not a yeast action. In a yeast action, either foreign or related to bread dough, sugar or salt in excess hold it down, while in normal quantities they tend to stabilize that action.

These separate batches I allow to stand at normal temperatures for later yeast action, ranging from the lowest point for such action which is approximately 60 degrees F. to 90 degrees F., the latter being the warmest that the gluten will stand without injury to it by way of losing its elasticity or firmness. I allow them to stand preferably not less than five hours and preferably not more than thirteen hours, after which they are combined with the necessary amount of yeast and water so that they can be kneaded or blended into a thoroughly homogeneous and normal mass, after which that dough is allowed to stand for the time necessary to get ready for the scaler, or divider, after which it will be moulded and raised, and baked, in the customary manner, producing a bread of pronounced flavor and masticability compared to that produced by the methods heretofore customarily employed.

In explanation as to why such doughs lend themselves better to machine dividing and moulding than the initially yeasted doughs, it is the previously mellowed gluten now less resistant to the expulsion of the gas; also the fact that the water has been well absorbed by the gluten so as to leave the surface free from stickiness; these circumstances in the initially yeasted doughs being effected only partially, the former being described as "buckiness".

This process has added nothing in point of time or labor, has evaded the expense of refrigeration, has curtailed the outlay for materials, enlightened the workman, solved the mystery of the attainment of deliciousness, and brought the art up to date to meet the problems brought about through modern methods of harvesting and milling and bakers' equipment.

What I claim as new and desire to secure by Letters Patent is:

1. The process of preparing a complete batch of yeast raised dough for making which consists in (1) mixing a partial batch of yeastless dough in quantity amounting to not less than one-fourth of the complete batch, omitting the customary salt and containing all the sugar necessary for the complete batch; (2) mixing another partial batch of yeastless dough of a quantity when added to the first mentioned partial batch amounting to enough to make the complete batch, omitting the customary sugar and containing all the salt necessary for the complete batch; (3) letting the two separate partial batches stand from preferably not less than five hours and preferably not more than twelve hours at temperatures from approximately 60 degrees F. to approximately 90 degrees F.; (4) uniting the two partial batchs with sufficient yeast and water and kneading the same to produce a perfectly homogeneous mass of normal bread dough; and (5) allowing the dough to rise.

2. The process of preparing a complete batch of yeast raised dough for baking which consists in (1) mixing a partial batch of yeastless dough, omitting the customary salt and using approximately twice the customary amount of sugar; (2) mixing another partial batch of yeastless dough of substantially the same quantity, but omitting the sugar, and using approximately twice the customary amount of salt; (3) letting the two separate batches stand from preferably not less than five hours and preferably not more than twelve hours at temperatures from approximately 60 degrees F. to approximately 90 degrees F.; (4) uniting the two partial batches with sufficient yeast and water and kneading the same to produce a perfectly homogeneous mass of normal bread dough; and (5) allowing the dough to rise.

HENRY JUNG.